June 7, 1938.  F. W. SELOSKE  2,119,945
GREEN CORN CUTTER
Filed Sept. 22, 1934   3 Sheets-Sheet 1
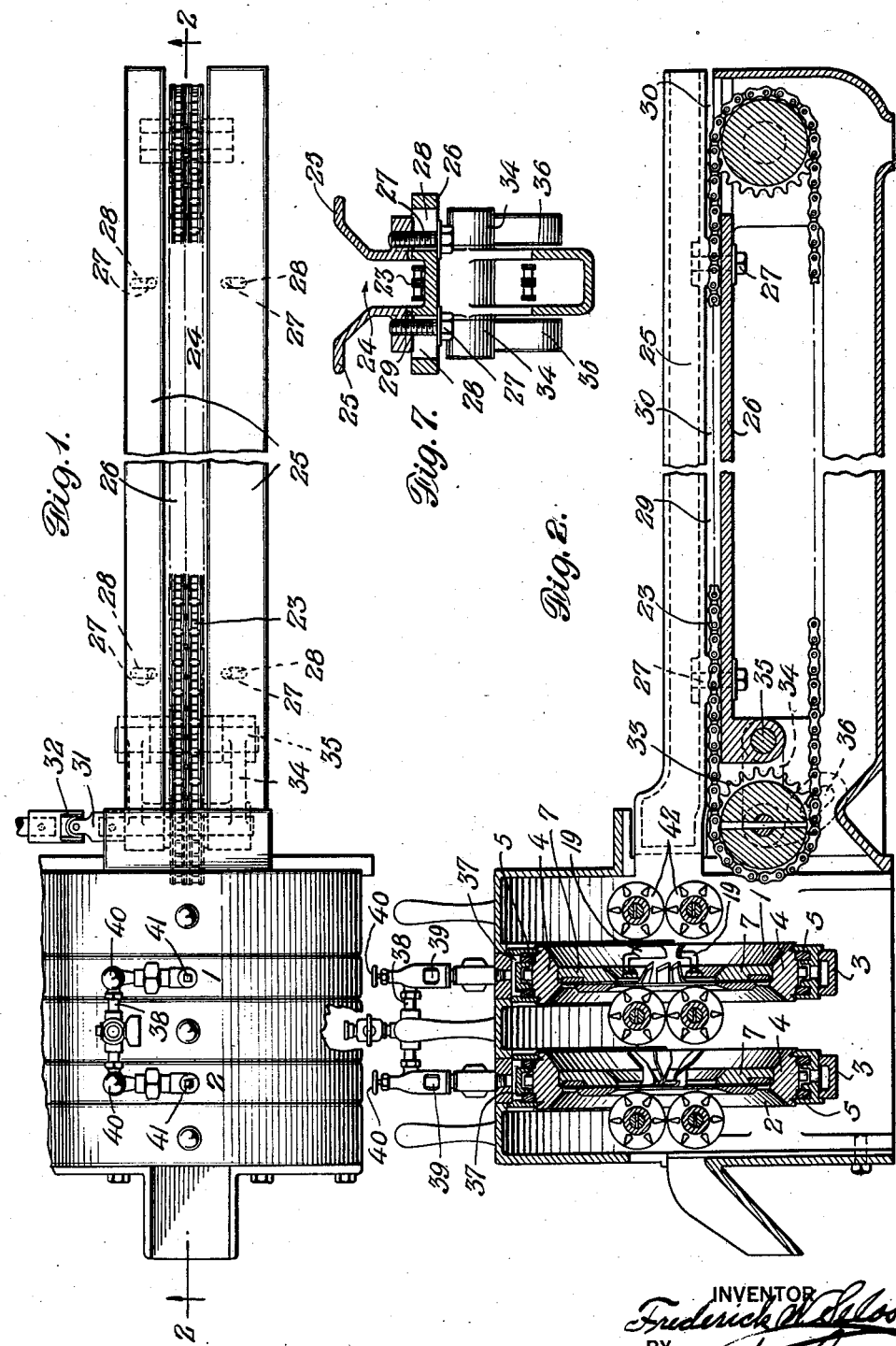
INVENTOR
Frederick W. Seloske
BY
Graham
ATTORNEY

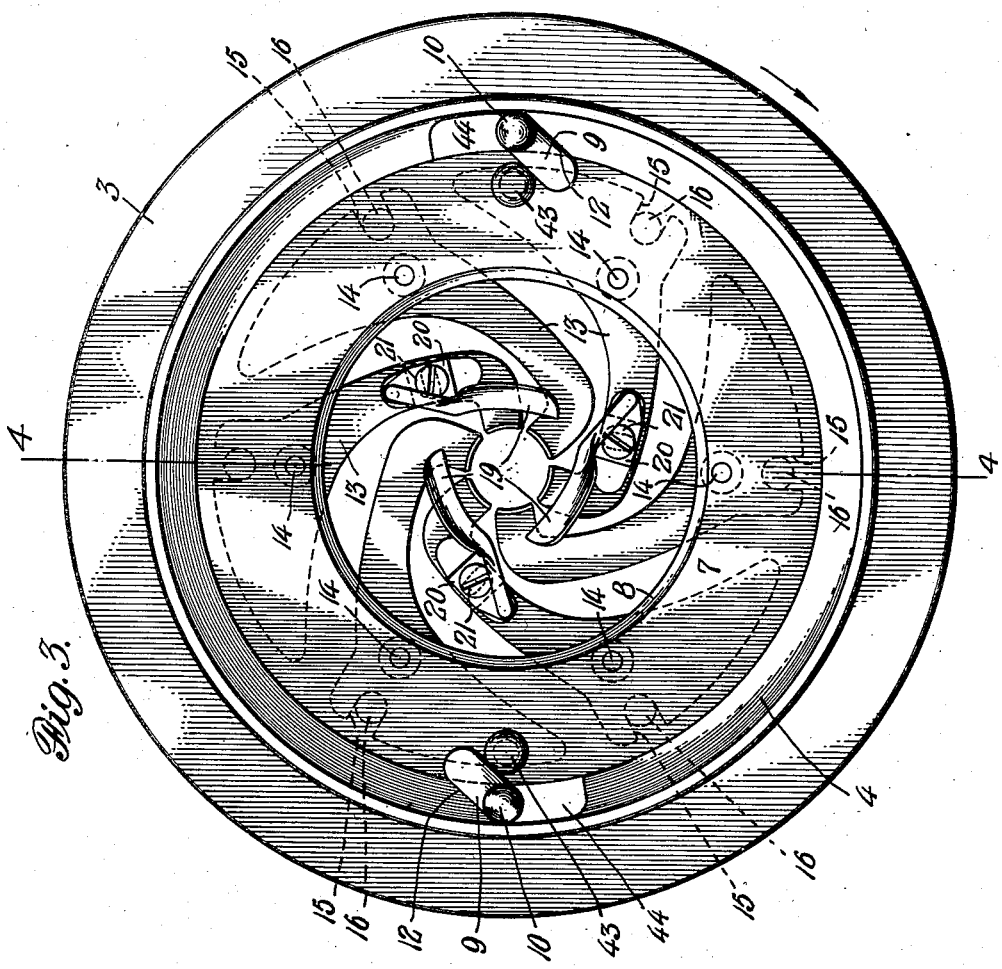
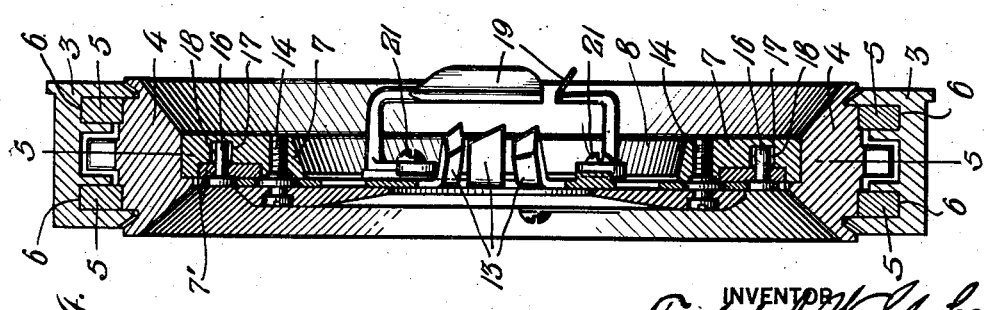

June 7, 1938.  F. W. SELOSKE  2,119,945
GREEN CORN CUTTER
Filed Sept. 22, 1934   3 Sheets-Sheet 3

INVENTOR
Frederick W. Seloske
BY
Graham
ATTORNEY

Patented June 7, 1938

2,119,945

UNITED STATES PATENT OFFICE 2,119,945

GREEN CORN CUTTER

Frederick W. Seloske, Hoopeston, Ill., assignor to Food Machinery Corporation, San Jose, Calif., a corporation of Delaware Application September 22, 1934, Serial No. 745,145

1 Claim. (Cl. 130—9)

This invention relates to improvements in green corn cutters and particularly to the type of green corn cutter illustrated and described in the co-pending Schmidt application Serial No. 635,679, now Patent 2,034,993, issued March 24, 1936.

In the Schmidt patent there are shown rotary cutter heads carrying cutters for removing the kernels from the cobs and also carrying gauging devices to center the ears to the cutters as they are presented thereto by the ear feeding devices.

The gauging devices are mounted on the same rotary head as the kernel cutters but on separated members carried by the head.

It has been found that a slight disadvantage ensues from this manner of mounting the gauging devices since it requires extra parts for carrying and adjusting the gauges and numerous joints between the gauging devices and the cutters.

The present improvement to the cutter head consists in mounting the ear centering and gauging devices directly on the cutter shanks so that they move integral with the cutters as they are expanded to accommodate the different size ears. This manner of mounting eliminates all joints and connections between the gauges and the cutters and permits a much closer and finer adjustment than is expedient with the former arrangement and removes all possible changes due to centrifugal forces.

In this manner of mounting the gauges directly on the cutter shanks also concentrates all of the centrifugal forces set up in the cutters and gauges into one piece of mechanism and causes the gauges and cutters to always expand in exactly the right ratio so that the kernels are cut from the cobs in the manner desired and the gauging cannot shift relative to the cutters in any manner.

It is therefore an object of the invention to provide a unit cutter head for removing the kernels from the cobs wherein the gauging devices for centering and guiding the ears into the cutters are mounted directly on the shanks of the cutters so that no lost motion can occur between these parts.

It is a further object of the invention to provide a cutter head for removing the kernels from the cobs wherein gauging devices for centering and guiding the ears into the cutters are mounted directly on the shanks of the cutters and having adjustment means somewhat radially from the center of rotation of the cutter head to thereby control the depth of cut.

It is a further object of the invention to provide a cutter head for cutting the kernels from the cobs of green corn wherein the cutters and ear gauges are both mounted on a removable member for easy and rapid interchange of cutters and gauges when necessary.

With such objects in view as well as other advantages inherent in the invention it is to be understood that applicant is not necessarily bound to the exact structure and arrangement shown; that the shown and described devices are more or less illustrative; are not necessarily drawn to scale and that some parts may be more or less exaggerated in size and arrangement to more clearly illustrate the creative part of the invention.

Reference being now had to the drawings where a clearer understanding of the invention will be had.

Figure 1 is a general plan view of a machine embodying the improvements.

Figure 2 is a vertical sectional elevation taken on substantially the line 2—2 of Figure 1.

Figure 3 is a side elevation of the cutter head showing the placement of the centering gauges on the shanks of the cutters.

Figure 4 is a sectional elevation taken on substantially the line 4—4 of Figure 3.

Figure 5:
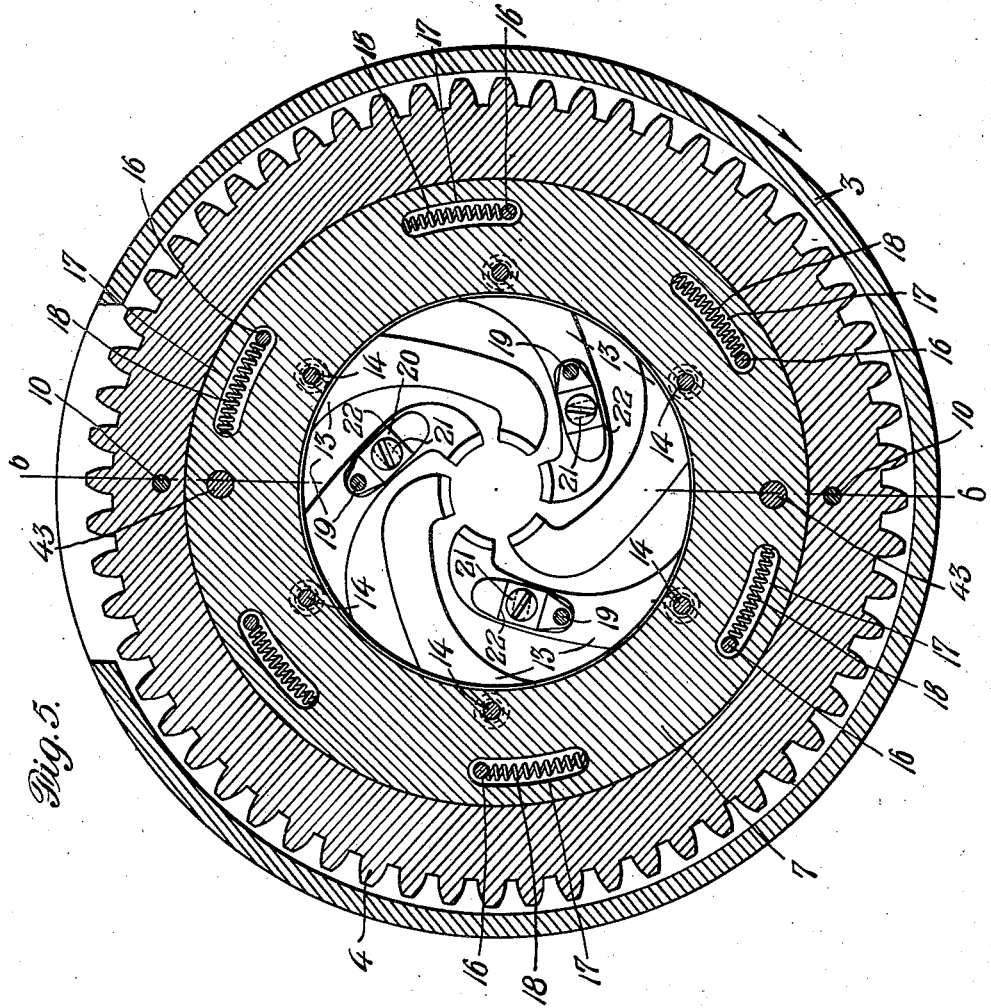
Figure 5 is a sectional plan of the cutter head taken on substantially the line 5—5 of Figure 4, but rotated through 90° showing the open spring pockets for the springs that control the tension on the cutter movement.

The improvements disclosed in this application have been applied to a green corn cutter employing two high speed rotary heads designated 1 and 2 mounted in fixed housings 3 and rotated by means of gears from a source of drive not shown, meshing with the gears 4 forming a part of each unit head. The gears 4 are ring gears and rotate on the inserted ring bearings 5 which are secured in channels 6 of the housings 3.

A removable circular plate 7 with a large central aperture 8 is carried by the ring gears 4 and is loosely positioned in the recess in the ring gear for easy and instant removal. During operation this plate 7 is held in operative relation in the machine by the drive dogs 9 pivoted to the ring gear 4 at 10, the dogs 9 normally resting against the inclined surface 12 of the plate 7.

The kernal cutters 13 are pivoted to the removable plate 7 as at 14. They each have a slot 15 shown in dotted lines in Figure 3, in which rests the pins 16, see also Figure 4. The pins 16 extend into the surface of the plate 7 into the recesses 17 and bear against the compression springs 18 which tend to hold the cutter blades in a closed position and under a predetermined tension, the closed position is substantially that of Figures 3 and 5. A ring 7', Fig. 4, is mounted in an annular recess in ring 7. The pins 16 extend through ring 7' which is movable relative to ring 7. This causes simultaneous movement of all the cutter blades.

Figure 6:
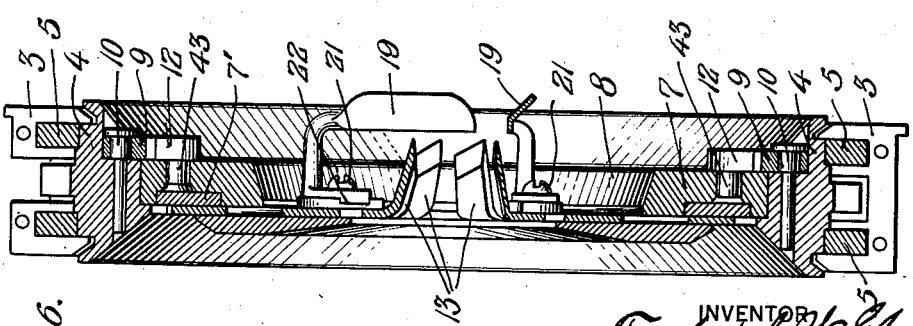
Figure 6 is a vertical sectional view taken on substantially the line 6—6 of Figure 5 and shows the cutter head parts at a section substantially 90 degrees from that of Figure 4.

The gauging devices for centering and guiding the ears into the cutters are designated at 19, Figure 3, and are secured to the shanks of the alternate cutters 13 as at 20 by means of the screws 21 and are capable of radial adjustment by means of the slots or grooves 22 seen best in Figure 5 and Figure 6. This manner of mounting the gauges directly on the shanks of the cutters and offset from a radial line through the cutters eliminates all joints and loose connections and saves many parts in manufacture and makes the adjustment relative to the cutting edges of the cutters very simple and efficient, and by mounting the gauges on alternate cutters and having each gauge overlap two cutters a saving in parts and rotating weight is effected, and a free and unobstructed path provided for the movement of the cut kernels as they are thrown from the cutters.

In the operation of machines of this type at high speeds and high efficiency it has been found that more or less of the starch juices of the cut kernels find their way into the bearings of the gears in the housing 3 and after a time somewhat gums up the bearings and adjacent parts.

To render these juices as harmless as possible water is fed into the spaces 37, Figure 2, a drop at a time during operation, by means of the connections and the sight feeds 39, the exact amount being controlled by suitable valves 40. Oil is supplied to the bearings at the necessary intervals through the plug holes 41. This feature is not claimed in this application but is claimed and shown in a copending application Serial No. 745,118 filed by C. A. Hoy of even date with this application.

It is believed that an operative description from now on will disclose the important features of this improvement in a better manner.

*Operation*

The foregoing description practically covers the main operative features of this improved green corn cutter. The husked ears are placed in the trough 24 either by hand or any suitable automatic feeder and as the chain 23 is running continuously the ears immediately move forward at quite a high lineal speed and if the elevation adjustment of the sprocket 33 is correct for the diameter ears being run the point of the ear is entered into the feed rolls 42 and immediately thrust into the gauges 19 and guided by them into the cutters 13. Due to the high rotative speed of the cutters and gauges and the feed rolls 42 it is highly important that the axial alignment of the advancing ear with the center of rotation of the gauges and cutters be as near perfect as possible, because if the point of the ear does not enter the feed rolls 42 properly it will not enter the gauges 19 or the cutters 13 properly and the result will be that the kernels will be more or less crushed and damaged and they will not be uniformly cut from the cob and as has been mentioned sometimes the ear is canted so much that it gets crosswise in the cutter head and requires considerable time to remove it during which time the advancing stream of corn is constantly piling up and causing stoppage all along the line. As has also been mentioned accurate alignment of the ears is highly important with a rotary head cutter, and is not nearly so important with stationary cutter heads where the cutters expand only.

In the non-rotating heads there are no centrifugal forces set up in the mechanism of the stationary heads as is the case in the rotary heads, the cutters and gauges only are expanded as the ears enter the cutters, and it makes little difference whether the ear is finely aligned or not, the only speed in the entire operation is the movement of the ear itself and because of this the ear can correct its alignment as it enters the gauges and cutters and passes through the cutters in proper cutting relation.

With the rotary heads of the type of machine shown in the present application, the cutters and gauges are controlled in their expansion by centrifugal forces against the tension of the compression springs 18. The tension of the springs is adjusted so that the cutters are held in an equilibrium and open somewhat more than shown in Figs. 3 and 5. The result of the centrifugal forces being balanced by the springs is that the cutters and gauges are very delicately poised while rotating at a high speed and the least touch will open the cutter circle and cause all of the cutters and gauges to expand. On account of the delicate poise of the cutters and gauges, the ear must enter the gauges and cutters in substantial axial alignment with the center of rotation of the gauges and cutters else the gauges and cutters will be unduly expanded and the cutting circle too large with the result that the first portion of kernels will not be properly cut as to depth and thus much valuable corn lost to the canner which will more or less pass away with the cob.

Following the rotary cutter head just described is another rotary head of the same general type but instead of being fitted with cutters the blades are shaped to produce a scraping effect on the cob to remove any adhering parts of kernels etc. This scraping head is further for the purpose of cutting what is termed "Cream style corn" wherein the first head is adjusted to cut off the tops of the kernels or possibly one-half of the kernels and then as the cob is advanced through the scraping head by the feed rolls between the heads and the feed rolls at the outside of the scraping head, the pulp remaining in the partly cut kernels is scraped from the cob and mixed with the half kernels first cut.

The control of the depth of cut with the "Cream style corn" is not so necessary as when cutting whole grain corn where the kernels are cut as close as possible to the cob without loosening the chaff. The delicate adjustment of the cutters and gauges and the proper alignment of the ears as has been described is practically imperative when cutting whole kernels for a whole grain product. Here the uniformity of cut and the uniformity of grain size determines largely the grading of the product in the hands of the jobbers and with this improved machine a better and more uniform grade of whole grain corn is produced than was heretofore possible, thus bringing to the canner a better price for his product.

In the operation of these high speed machines it is imperative that the entire set of cutters in a head can be changed in a minimum of time and this improved cutter head is designed to permit of a very rapid change and replacement.

The center plate 7 of the cutter head, and the same for the scraper head, is quickly removable simply by hand and usually without the necessity of tools. Since this plate carries all of the cutters and gauges and all of the operating mechanism combined therewith, its complete removal from the ring gear 4 instantly removes all of the operative mechanism.

As has been described this plate 7 is held in operative relation in the ring gear 4 by means of the locking dogs 9 riding on the surface of the plate 7. The ring gear is rotated in the direction of the arrow Fig. 3 with the result that the dogs 9 and pins 43 act as drivers and move the center plate 7 with the ring gear and by overlapping the plate 7 while resting on the surface 12 tend to hold the plate in axial adjustment with the ring gear.

To remove the plate 7 and all the attendant mechanism it is simply necessary to rotate the plate 7 counter to the direction of normal rotation in operation when the pins 43 will be moved away from the dogs 9 which will be caused to lie in the space 44 by swinging on their pivots 10, they will then not overlap the plate 7 which can be lifted bodily from its recess in the ring gear 4.

What I claim as new and desire to secure by Letters Patent is:

In a green corn cutter, a rotary head assembly including cutter blades for removing the kernels from the cob, a ring member to which the cutter blades are pivoted, depth of cut gauges mounted directly on the shanks of said cutter blades and adapted to move in unison therewith, guide means fixedly secured to the cutter blade shanks and having interlocking engagement with the depth of cut gauges to hold them in a definite relation to the cutter blades, said guide means being offset from a radial line through the cutter blades so as to give free and unobstructed movement of the cut kernels as they are thrown away from the cutters, and means providing relative adjustable movement between the cutter blades and the depth of cut gauges to thereby vary the depth of cut at will.

FREDERICK W. SELOSKE.